Figure 9:
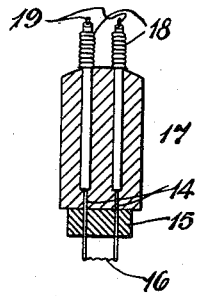

June 18, 1940.　　　C. R. JOHNSON　　　2,204,994
ELECTRIC BLASTING INITIATOR
Filed July 19, 1939　　　3 Sheets-Sheet 1

Charles R. Johnson　INVENTOR
BY　Thos. A. Wilson
ATTORNEY

June 18, 1940.  C. R. JOHNSON  2,204,994
ELECTRIC BLASTING INITIATOR
Filed July 19, 1939    3 Sheets-Sheet 2

Charles R. Johnson
INVENTOR
BY Thos. A. Wilson
ATTORNEY

June 18, 1940.  C. R. JOHNSON  2,204,994
ELECTRIC BLASTING INITIATOR
Filed July 19, 1939   3 Sheets—Sheet 3

Heat applied

Charles R. Johnson
INVENTOR
BY Thos. A. Wilson
ATTORNEY

Patented June 18, 1940

2,204,994

UNITED STATES PATENT OFFICE 2,204,994

ELECTRIC BLASTING INITIATOR

Charles Russell Johnson, Glenn Mills, Pa., assignor to E. I. du Pont de Nemours & Company, Wilmington, Del., a corporation of Delaware Application July 19, 1939, Serial No. 285,241

7 Claims. (Cl. 18—42)

The present invention relates to electric blasting initiators and more particularly to a novel and improved method and apparatus for the manufacture of the same.

This application is a continuation-in-part of my copending application Serial Number 181,643, filed December 24, 1937.

As is well known, the usual procedure for the manufacture of electric blasting initiators comprises embedding the leg wires in a hard, cast plug of sulfur and subsequently sealing this unit into place in a loaded shell by means of waterproofing or sealing compositions. Such a procedure is not adaptable to a mechanical method of assembly but includes several complicated and indispensable hand operations involving both molding materials and loaded shells. Furthermore, due to the frangible nature of the crystalline sealing compositions employed, the resulting assembly fails to provide adequate moisture protection for the explosive charge under varying conditions of storage and changing temperatures.

The object of the present invention is a new and improved method and apparatus for the manufacture of electric blasting initiators. A further object is a labor saving method whereby a waterproof initiator is produced without the use of sealing compounds. An additional object is a labor saving process for producing in large numbers an electric blasting initiator which is readily adaptable to mechanical assembly. A further object is a process for producing blasting initiators provided with plastic insulation. Additional objects will be apparent from the following detailed discussion of my invention.

I have found that these objects are accomplished and the foregoing disadvantages overcome by manufacturing electric blasting initiators according to the process of my invention which comprises placing two lengths of wire substantially parallel to each other, introducing a supply of plug composition at two positions along the length of said wires, severing the wire between said positions, heating each supply of said plug composition and molding the same into a plug of predetermined shape about said wires. The material employed may be a rubber composition or any other vulcanizable or thermoplastic material. After the plug is formed it is crimped into place in a charged shell to form a waterproof electric blasting initiator.

I find my process to be advantageous for molding said rubber composition plugs on leg wires provided with plastic insulation, especially since my double molding cooperates conveniently with the necessary steps for stripping portions of said plastic insulation from the wire to form bridge posts at the end of the plug.

In carrying out the foregoing process I prefer to employ a novel molding device. This mold comprises at least and preferably two sections which fit together to form two rows of plug chambers disposed with base ends face to face. By the base of the plug I mean that end from which the short terminals of the leg wires project, namely the end intended to be inserted downwards in the cap shell toward the explosive charge in the completed initiator. Accordingly, the base end of the plug chamber is that end adapted to form the base of the plug.

Between the two plug chambers with abutting base ends is a central concavity disposed approximately parallel to said rows. These rows of plug chambers and the concavity between, are formed by the cooperation of corresponding depressions and concavities in each of the two sections of the mold. In the one section which I prefer to denote the upper section, the concavity is equipped with knives approximately parallel to each row of plug chamber depressions. In the other or lower section of the mold the concavity is equipped with shoulders similarly disposed. When the mold is closed by placing the upper and lower sections together, a shearing effect is produced between each knife in the upper section and the corresponding shoulder in the lower section. This shearing effect has the following purpose.

In operation, two wires of structure suitable for electric blasting initiator leg wires, are stretched across each pair of plug chamber depressions in the lower section of the mold, passing through entries and guides in the wall of each depression, and passing over the shoulders bounding each side of the central concavity located between the base ends of each pair of plug chamber depressions. Then strips of plug composition are placed in the chamber depressions.

The upper section of the mold its then brought down to join with the lower section, causing that portion of each wire passing across the central cavity between rows, to be severed in two places by the cooperation of said knives and shoulders. Then the mold is heated to form the plugs about the wires. In this manner twice as many plugs are produced with a single operation of threading wires through the mold.

Whereas the process according to my invention has the foregoing broad application to the manufacture of electric blasting initiator plugs generally, and may be carried out in apparatus already described, regardless of the shape of the plug chamber, this process is particularly desirable in the manufacture of plugs of the wedge type as described and claimed in co-pending application Serial Number 181,644, filed December 24, 1937. Accordingly I prefer to describe my invention in detail in connnection with its application to the manufacture of plugs of that type.

In order to describe the invention more clearly in connection with the wedge type plug I shall refer to the attached drawings which illustrate this preferred embodiment. This is done solely by way of illustration and is not to be regarded as a limitation upon the scope of my invention, since many variations within the purview of this invention will be readily apparent to anyone skilled in the art.

Figure 11:
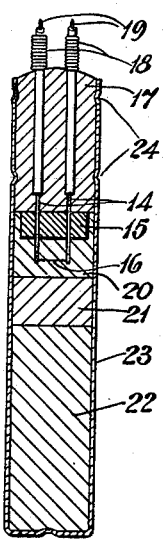
Figure 10:
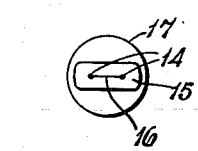
Figure 1:
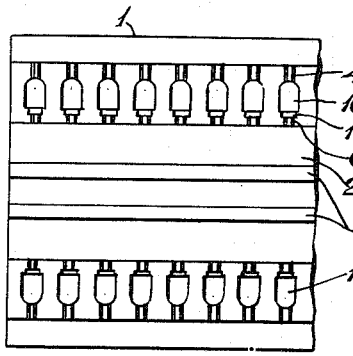
Figure 1:
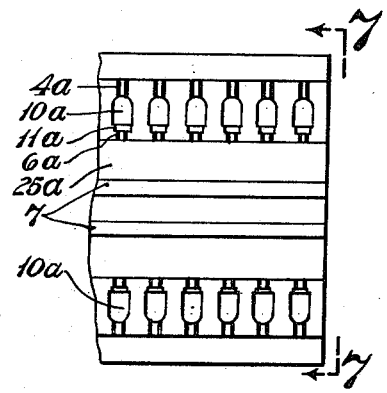
Figure 2:
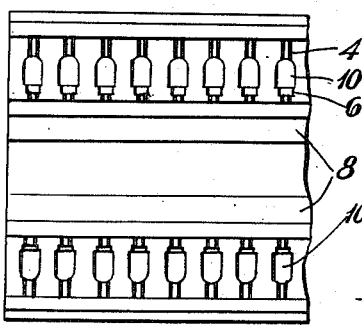
Figure 2:
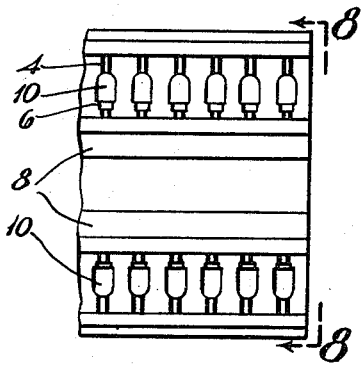
Figure 3:
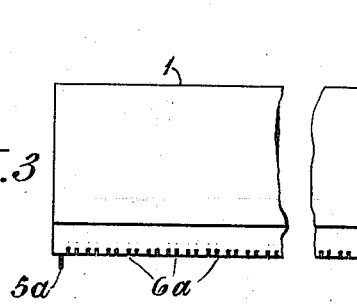
Figure 4:
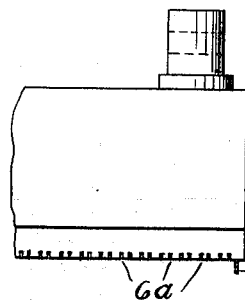
Figure 4:
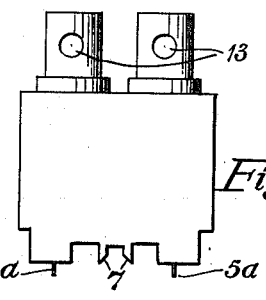
Figure 5:
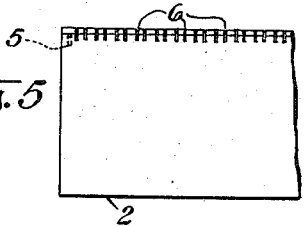
Figure 6:
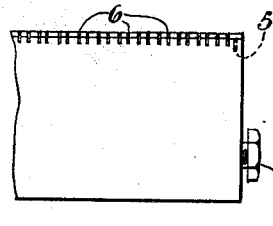
Figure 6:
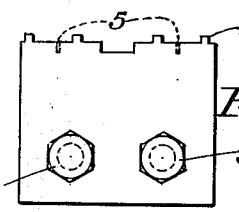
Figure 7:
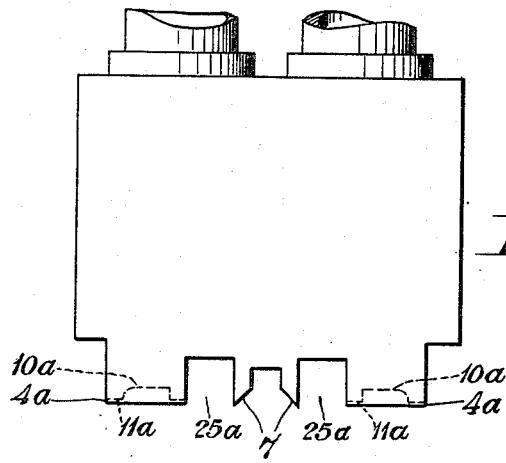
Figure 8:
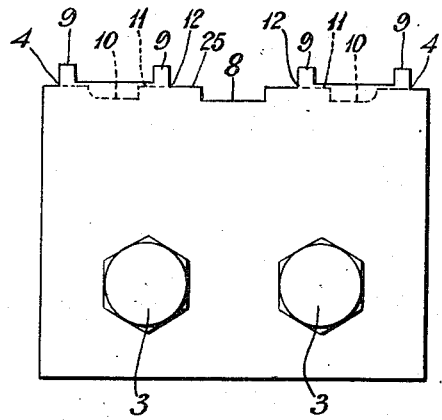
Figure 12:
Figure 13:
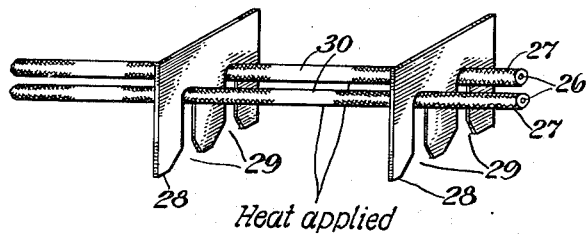
Figure 14:
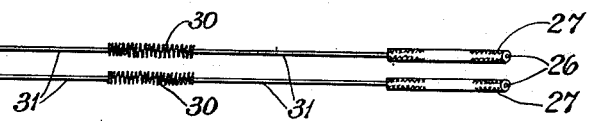
Figure 15:
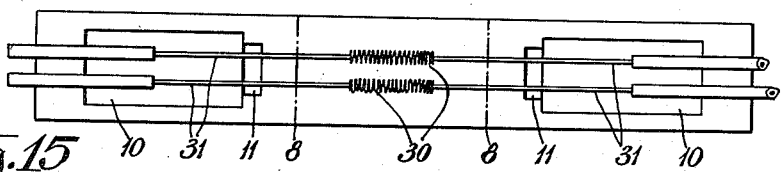
Figure 16:
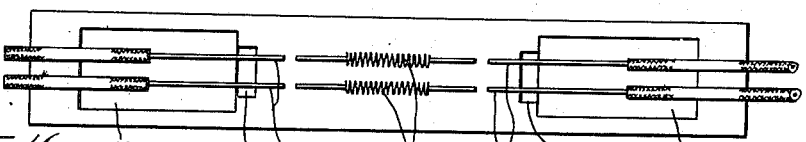
Figure 17:
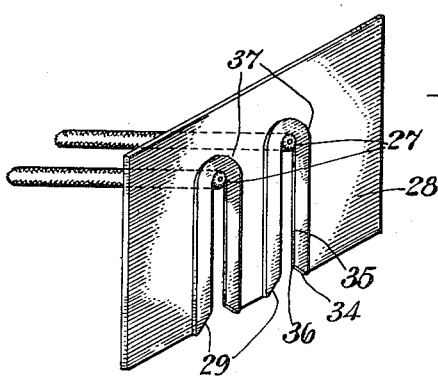

Referring generally to the various figures of the drawings, Figure 1 is a bottom view of the upper section of the mold, while Figure 2 represents a plan view of the lower section. Figure 3 is a vertical elevation of the upper section, while Figure 4 is a similar end view of the same section. Figure 5 is a vertical elevation of the lower portion of the mold and Figure 6 is a similar end view of the same. Figures 7 and 8 are enlarged vertical end sections of the top and bottom sections respectively, showing some of the parts in detail. Figure 9 is a vertical section of the preferred form of plug. Figure 10 is an end view of the plug showing the wedge thereon as disclosed and claimed in co-pending application Serial No. 181,644, filed December 24, 1937. Figure 11 is a vertical section of a complete electric blasting cap assembly containing the plug described above. Figures 12 through 17 show the application of my molding method to wires covered with plastic insulation, the convenient portions of the latter being stripped therefrom. Thus Figure 12 is a view of a pair of said plastic covered wires. Figure 13 is a view of the same wires with stripping blades positioned thereon. Figure 14 is a view of the same wires after the plastic insulation has been stripped toward the central portion. Figure 15 is a view of said stripped wires disposed in my mold. Figure 16 is a similar view after the severance of the central portion of the wires bearing the surplus of insulation. Figure 17 is a detailed view of the stripping blade.

Similar characters are used throughout the several views and in the following description to designate corresponding parts.

Referring in greater detail to the drawings of the mold, Figure 1 shows the upper section of the mold 1 containing two parallel rows of semi-cylindrical plug chamber depressions 10—a disposed with base ends face to face. These rows of depressions are separated by the central concavity 25—a in which is mounted the knives 7. Each chamber depression 10 is joined with a wedge chamber depression 11. Each chamber is equipped with centering guides 6—a and the entries 4—a through which the leg wires may be passed and held in position in the chamber. Figure 2 shows the lower section of the mold 2 equipped with two rows of semi-cylindrical depressions 10 corresponding to similar depressions 10—a of the upper section. Each chamber is joined with a wedge chamber depression 11 corresponding to a wedge chamber depression 11—a of the upper section. These rows are separated by the central cavity 25 corresponding to cavity 25—a of the upper section. Cavity 25 is equipped with shoulders 8 so positioned as to cooperate in shearing effect with the knives 7 of the upper section when the two sections of the mold are joined. At the same time the plug chamber depressions of both sections are joined to form plug chambers. When the mold is thus brought together pins 5—a of the upper section as shown in Figures 1, 3, and 4 slip into the sockets 5 in the lower section as shown in Figures 2, 5, and 6, serving to align properly the two sections as well as to prevent any slipping during the molding operation. The centering guides 6 of Figures 2, 5, and 6 cooperate with the guides 6—a of Figures 1, 3, and 4 to hold the ends of the leg wires firmly in place during the molding operation. Numeral 3 of Figures 5 and 6 designates the covering for pipe taps through which steam is passed in order to heat the mold to the desired temperature. The taps 13 in the top section of the mold as shown in Figure 4 serve as inlets and outlets for the same.

Referring in greater detail to the drawings of the finished plug resulting from this process as shown in Figures 9 and 10, the bare ends 14 of the plug wires are shown in Figure 9 to be embedded in the body of the composition plug 17 and also in the relatively narrow wedge 15 which extends beyond the central portion of the base of said plug. It will be noted that the insulated portions 19 of the leg wires, are likewise embedded in the plug 2. The labyrinth 18 has been formed immediately above the bridge plug as a result of the preferred process for molding said plug about the leg wires, as described in detail hereinafter. The bridge wire 16 connects the bare ends of the leg wires.

In Figure 10 the general relative proportions of the area of the cross-section of the wedge 15 and that of the bridge plug 17, may be observed. The leg wires 14 are shown in position and are connected by the bridge wire 16.

In Figure 11 may be seen the location of the composition bridge plug in the assembled electric blasting cap. The plug is crimped in place in the open end of the electric blasting cap shell 23, said closure being effected by means of the internal annular beads or grooves 24 in the shell wall, whereby the plug is gripped and held firmly in position. The bridge wire 16 is embedded in an ignition composition 20, below which is a priming composition 21 and a base charge 22.

A detailed description of the preferred process of my invention is as follows: The leg wires are introduced into the lower section of the mold by passing them through the entries 4, and on through the plug and wedge concavities 10 and 11 by way of the guides 6, emerging at 12 to extend across the central cavity 25 and the shoulders 8, into the opposite wedge and plug chambers thus passing continuously through both the left and right hand units of the mold as indicated in Figure 8. Two strips of plug composition are introduced along the entire length of each mold unit between the guide posts 9. The two sections of the mold are then brought together. In making contact, the knives 7 of the top section come into immediate proximity with the shoulders 8 of the bottom section and thus shear off the wire which extends beyond the shoulders 8. These severed sections of wire merely remain in the space between these shoulders. Steam being continuously circulated through taps 3 and 13, maintains the temperature of the mold at a point at which the plug composition becomes fluid and takes the shape of the concavity shown by the dotted lines in Figures 7 and 8. The upper and lower portions of the mold are held together so tightly as to cause the compression of the hot composition about the leg wires, thus effecting the water impervious seal between the plug and said leg wires. During this compression period, the molten composition is prevented from being exuded from the mold along the insulated portion of the leg wires by means of the labyrinth formed by the tapped entries 4 which tightly grip said insulation. After the desired molding period, the two sections of the mold are separated and the wires, enclosed in the plug of preferred characteristics, are removed. The labyrinth bounded by the tapped entries 4 is reproduced in the corrugated portions 18 formed on the leg wires immediately above the plug. Accordingly, this corrugation itself will be referred to as a labyrinth. The labyrinth, of course, is not functional in the finished plug, but serves as an efficient check to prevent the flow of plastic materials out of the mold during the compression period. The labyrinth will, of course, take the shape of the particular entry employed. If a tortuous entry is employed the labyrinth will be tortuous. If a direct entry is used, there will be no noticeable labyrinth formed. Any suitable plug composition may be employed in this process including rubber compositions as disclosed and claimed in co-pending application Serial No. 181,644, filed December 24, 1937, and the thermoplastic compositions as disclosed and claimed in co-pending application Serial No. 181,645, filed December 24, 1937.

The finished bridge plug is then introduced into the open end of the charged electric blasting cap shell 23 and crimped into a water impervious relationship with said shell.

My molding process is particularly advantageous when applied to the wire coated with plastic insulation such as ethyl cellulose compositions or the like, in combination with certain novel stripping steps. Referring in detail to Figures 12 through 17, it will be noted that a pair of wires 26 covered with plastic 27, as shown in Figure 12, are placed side by side in parallel arrangement and two stripping blades are brought down on said wires at a predetermined distance apart, as shown in Figure 13, while the central portions 30 of said wires between said blades are heated to make the plastic more readily displaceable. After heating has taken place, said stripping blades are drawn towards each other into said heated central portions 30 of the wires. Since each wire is positioned in the stripping slot 29 of each blade, this step of drawing the blades nearer together causes said heated plastic insulation to be stripped toward the central portion 30, leaving a bared portion 31 on each side of said central portion 30, as shown in Figure 14. After the insulation on the wires has been stripped toward the center in this way, the wires are disposed in my mold, as shown in Figure 15, each wire passing through the left-hand mold cavity 10, the wedge cavity 11, which is a reduced extension of 10, across the central portion of the mold bounded by the shoulders 8, and into the right-hand plug chamber 10 by way of the extension chamber 11, and out the other end of said chamber. As shown in Figure 15, these stripped wires are preferably so disposed in my mold that the portion of plastic insulation on the left and right ends of the wires terminates within the left and right end mold chambers 10, respectively, so that part of the stripped portion 31 extends within each mold and a portion thereof extends beyond the base of each mold chamber. It will be noted that the central portion of each wire 30, bearing the accumulated stripped plastic, lies in the region between the shoulders 8. When, as described in detail in the foregoing, the upper portion of the mold is brought down so that knives 7, as shown in Figure 4, cooperate with shoulders 8, this central portion 30, bearing the stripped surplus insulation, is severed a predetermined distance from the base of each plug chamber, as shown in Figure 16, leaving a predetermined length of each wire 33 projecting from each plug chamber as a bridge post for the finished plug. It will be appreciated that in this way my double molding process and apparatus are especially advantageous when combined with my step involving the heated stripping of wires provided with thermoplastic insulation, for the reason that not only am I able to mold two plugs at once, but by providing space between shoulders 8, I am able to completely eliminate the central portion 30 of each wire bearing the piled up insulation which has accumulated from the stripping of the bare portions 31 of each wire.

I prefer to employ stripping blades provided with stripping slots of the type shown in Figure 17, having a beveled portion 34 at the lower end and being relieved inward in the portion 35, leaving a portion of land to form the flat edge 36 approximately .010 inch in width. The wire 27 in the final stripping position, is shown in the circular upper portion 37 of each blade.

The foregoing method of assembly, as well as the electric blasting initiator resulting therefrom, offer outstanding advantages over the art. By the development of a method of assembly wherein no waterproofing or sealing materials are necessary, I have eliminated the hazards inherent in the old process of pouring molten materials by hand into a loaded shell. In my process, the bridge plug is simply crimped in place in the loaded shell, a step which may be readily mechanized, and carried out at normal temperatures. Furthermore, my assembly is an exceptionally strong one mechanically, thus permitting greater exposure security without damage to the blasting cap. Tests have demonstrated that blasting caps made by my invention are capable of consistently withstanding much higher water pressures than the ordinary type wherein waterproofing and sealing materials are employed. In addition, the elimination of such waterproofing and sealing compounds makes possible an initiator of much smaller length.

In addition to the foregoing advantages obtained with this type of blasting initiator, the particular process and apparatus according to my invention offer the advantage that these novel plugs may be manufactured in extremely large numbers substantially in the absence of any manual operation. Furthermore by threading the leg wires through two lines of plugs at once and severing the wires in the intervening space I am able to make twice as many plugs as could otherwise be produced. This time and labor saving step is an important factor in the production of thousands of such plugs and initiators each day.

Most important of all the advantages of my combined molding and stripping process is the fact that it makes possible the molding of two rubber composition plugs in the same operation on wire provided with thermoplastic insulation, in a highly simplified and efficient manner.

In the foregoing, I have described my improved process apparatus and initiator in detail. It will be apparent, however, that many variations may be made without departing from the scope of my invention. For instance the heating of the central portion of the wires may be carried out by means of a heated bar, or by any suitable means. I intend, therefore, to be limited only by the following claims:

I claim:

1. The method of forming composition plugs about the leg wires of electric blasting initiators which comprises placing two lengths of wire in closely spaced substantially parallel relation to each other, placing a supply of plug composition about the paired wires at each of two separate positions along the length of said wires, severing each wire twice in the portion intervening between said supplies of plug composition, each severance being made a predetermined distance from said plug composition for the formation of bridge posts, and molding each supply of said plug composition into a plug of predetermined shape about both wires and between the same, permitting said bridge posts to extend from the base of each plug.

2. The method of forming composition plugs about the leg wires of electric blasting initiators which comprises placing two lengths of wire in closely spaced substantially parallel relation to each other, molding two plugs with base ends face to face about both wires and between the same at separate positions thereon and severing each wire a given distance from the base of each plug, leaving a given length of each wire protruding from the base of each plug for the formation of bridge posts.

3. The method of forming composition plugs about the leg wires of electric blasting initiators which comprises passing two wires in closely spaced substantially parallel relation through each of two plug chambers disposed with base ends abutting, introducing a supply of plug composition into each of said chambers in juxtaposition with the paired wires passing therethrough, severing each wire a given distance from the base of each plug chamber, leaving a given length of each wire protruding from the base of said chamber, and molding each supply of plug composition in said chambers into a plug of predetermined shape about both wires and between the same, the protruding length of each wire extending from the base of each finished plug for the formation of bridge posts.

4. Apparatus for molding composition plugs about the leg wires of electric blasting initiators, comprising a mold in at least two sections provided with two rows of plug chambers disposed with base ends face to face, said plug chambers being formed by the cooperation of corresponding depressions in each of the two sections of said mold, one section of said mold being provided with two knives disposed in a concavity between the rows of plug chamber depressions of that section, each of said knives being disposed adjacent to and substantially parallel with the base end of one of said rows of plug chamber depressions, the other section of said mold being provided with two shoulders disposed in the concavity between the rows of plug chamber depressions of that other section, each of said shoulders being disposed adjacent to and substantially parallel with the base ends of one of said rows of plug chamber depressions, said knives and said shoulders being so disposed in said separate sections of said mold as to cooperate in the production of a shearing effect when said separate sections of the mold are joined, said plug chambers formed by the joinder of the plug chamber depressions of the separate sections of the mold being provided with entries and guides adapted to the reception of said electrical conductors providing a continuous passage for a conductor through each plug chamber in one row across the concavity between rows and through the corresponding plug chamber in the other row, said passage being continuous when the two sections of said mold are apart, but discontinued near the base of each plug chamber when said sections of the mold are joined due to the shearing effect produced by said cooperation of said knives of one section with said shoulders of the other section, whereby conductors extending across said concavity from chambers in opposite rows will be severed.

5. Apparatus for molding composition plugs about the leg wires of electric blasting initiators, comprising a mold in at least two sections provided with two rows of plug chambers disposed with base ends face to face, passages for leg wires through corresponding chambers in opposite rows including entries and guides, said passages being continuous when the sections of said mold are apart, and two sets of cutting means disposed at two positions a given distance apart between said rows of plug chambers and each at a given distance from the base end of the adjacent plug chamber for severing out from each of the leg wires placed in said passages a length corresponding to said given distance between said two sets of cutting means.

6. The method of forming composition plugs about the leg wires of electric blasting initiators which are covered with plastic insulation, which comprises placing two lengths of said wire in closely spaced, substantially parallel relation to each other, disposing two stripping blades a predetermined distance apart on the wires, heating the plastic insulation on that portion of the wires disposed between said stripping blades, moving said stripping blades closer together to strip said heated plastic insulation toward the central portion of the wires between said blades, placing a supply of plug composition about the bared wires at each of two separate positions along the length of said wires including the locus in which the end portions of the plastic insulation terminate and the stripped portions commence, severing each wire twice in the stripped portion to cut out the central portion bearing accumulated insulation, each severance being made a predetermined distance from said plug composition for the formation of bridge posts, and molding each supply of said plug composition into a plug of predetermined shape about both wires and between the same permitting said bridge posts to extend from the base of each plug.

7. The method of forming composition plugs about the leg wires of electric blasting initiators which are covered with plastic insulation, which comprises placing two lengths of said wire in closely spaced, substantially parallel relation to each other, disposing two stripping blades a predetermined distance apart on the wires, heating the plastic insulation on that portion of the wires disposed between said stripping blades, moving said stripping blades closer together to strip said heated plastic insulation toward the central portion of the wires between said blades, placing a supply of plug composition about the bared wires at each of two separate positions along the length of said wires including the locus in which the end portions of the plastic insulation terminate and the stripped portions commence, molding each supply of said plug composition into a plug of predetermined shape about both wires and between the same permitting said bridge posts to extend from the base of each plug, and severing each wire twice in the stripped portion to cut out the central portion bearing accumulated insulation, each severance being made a predetermined distance from said plug composition for the formation of bridge posts.

CHARLES RUSSELL JOHNSON.